United States Patent
George et al.

(10) Patent No.: US 11,576,305 B2
(45) Date of Patent: Feb. 14, 2023

(54) HARVESTING OF CROPS

(71) Applicant: KMS PROJECTS LIMITED, Syston (GB)

(72) Inventors: Estwick George, Leicester (GB); Peter Keeling, Syston (GB)

(73) Assignee: KMS PROJECTS LIMITED, Syston (GB)

( * ) Notice: Subject to any disclaimer, the term of this patent is extended or adjusted under 35 U.S.C. 154(b) by 415 days.

(21) Appl. No.: 16/956,415

(22) PCT Filed: Dec. 21, 2018

(86) PCT No.: PCT/GB2018/053754
§ 371 (c)(1),
(2) Date: Jun. 19, 2020

(87) PCT Pub. No.: WO2019/122927
PCT Pub. Date: Jun. 27, 2019

(65) Prior Publication Data
US 2020/0390036 A1    Dec. 17, 2020

(30) Foreign Application Priority Data
Dec. 21, 2017 (GB) ..................... 1721595

(51) Int. Cl.
*A01D 46/30* (2006.01)
*A01B 79/00* (2006.01)

(52) U.S. Cl.
CPC ............ *A01D 46/30* (2013.01); *A01B 79/005* (2013.01)

(58) Field of Classification Search
CPC .................................................... A01D 46/30
See application file for complete search history.

(56) References Cited

U.S. PATENT DOCUMENTS

2010/0287898 A1* 11/2010 Ringwald .............. A01D 46/08
 56/10.2 E
2016/0106038 A1* 4/2016 Boyd ................... A01D 34/006
 56/10.2 J
(Continued)

FOREIGN PATENT DOCUMENTS

CN  103798217 A  *  5/2014
CN  109922652 B  *  7/2022  ........... A01D 34/006
(Continued)

OTHER PUBLICATIONS

International Search Report for PCT/GB2018/053753 dated Mar. 19, 2019.

*Primary Examiner* — Shelley Chen
(74) *Attorney, Agent, or Firm* — Caesar Rivise, PC

(57) ABSTRACT

Method and Apparatus for harvesting crops, the apparatus (1) comprising a carriage (2) provided with a harvesting device (41), a ground height measuring device to measure or estimate the ground height (S2) at each harvested crop, a crop height measuring device to measure the height of a crop(S4), a processor operatively connected to the ground height measuring device to generate baseline ground data (S3) and operatively connected to the crop height measuring device to determine a desired harvest height (S5), a comparator to compare the baseline ground data to the desired harvest height to determine if a particular crop is to be harvested by the harvesting device.

10 Claims, 10 Drawing Sheets

(56) References Cited

U.S. PATENT DOCUMENTS

| | | | |
|---|---|---|---|
| 2018/0242517 A1* | 8/2018 | Davis | A01B 69/001 |
| 2018/0271016 A1* | 9/2018 | Milano | A01D 33/14 |
| 2019/0170860 A1* | 6/2019 | Burke | G01S 15/88 |
| 2019/0297778 A1* | 10/2019 | George | A01D 45/26 |

FOREIGN PATENT DOCUMENTS

| | | | | |
|---|---|---|---|---|
| EP | 1269823 A1 * | 1/2003 | | A01D 41/141 |
| JP | 2000316344 A * | 11/2000 | | |
| JP | 2001178236 A * | 7/2001 | | |
| JP | 2001190114 A * | 7/2001 | | |
| JP | 2001211717 A * | 8/2001 | | |
| JP | 3580745 B2 * | 10/2004 | | |
| JP | 3585410 B2 * | 11/2004 | | |
| JP | 2010081804 A * | 4/2010 | | |
| WO | 2017212267 A1 | 12/2017 | | |
| WO | WO-2017212267 A1 * | 12/2017 | | A01B 79/005 |

* cited by examiner

HARVESTING OF CROPS

FIELD OF THE INVENTION

This invention relates generally to the harvesting of crops and to a device for so doing. More specifically, although not exclusively, this invention relates to the selective and/or rapid harvesting of crops and to a device for so doing.

BACKGROUND ART

Crops have traditionally been harvested by hand which is an arduous and time-consuming process. Consequently, hand harvesting of crops is an expensive process and crops harvested in this manner incorporate this expense in the cost to the consumer. The specific expense is dependent, at least in part, on the wage-bill paid to the work-force and the efficiency of that work-force at harvesting crops. The wage-bill of work-forces is projected to increase which will therefore result in a greater expense of harvesting and consequentially crops which are more expensive for the consumer. This increase is particularly evident in the United Kingdom, where a 'National Living Wage' was brought into force in April 2016 by the UK Government. This measure ensures that workers must be paid a relatively increased base wage for their work, which will consequently lead to an increase in the expense of manual harvesting and therefore of manually harvested crops.

It is known to harvest crops utilizing automated methods. However, these automated methods have a variety of drawbacks, not least, in at least some cases, the indiscriminate nature of the crops harvested thereby. Moreover, with known automated methods unwanted matter (or contaminates) may be disadvantageously harvested along with crops, for example soil and/or weeds. Such contaminated harvested crops require further post processing to separate the useful crops from the contaminates. Furthermore, automated methods of harvesting result in periodic damage to the automated harvester which results in increased costs of repair and down-time of the harvesting device. One cause of such damage is from impact between the harvesting device and surfaces in the vicinity of crops to be harvested.

Not all crop plants grow at the same rate. For example, certain crops will fail to grow, will grow more slowly, or will grow in an undesirable manner and/or into an undesirable form. Consumers of crops, for example wholesalers or end-consumers, commonly demand stringent standards concerning the attributes of crops supplied to them. These attributes may include the size, shape, colour, ripeness, quantity of additional crop plant (e.g. root, stalk and/or foliage) still attached, etc. of the crops. For example, it is known for some retailers to require that broccoli crops sold by them are between a maximum and a minimum size and/or that a stalk is still attached to the broccoli crop, where the stalk is between a minimum and maximum size (e.g. length).

Moreover, during harvesting it is disadvantageous to harvest crops below a minimum threshold size or threshold ripeness or which are damaged or defective in some other fashion. Such crops may not be saleable to an intermediary (for example a wholesaler or supermarket) or consumer and will therefore be wasted. If such crops are not harvested they may continue to grow and/or ripen and consequently achieve a saleable size and/or ripeness in due course. Furthermore, it is known for some intermediaries to require only crops having specific characteristics. Some intermediaries or consumers require only crops having characteristics which lie between specific limits, for example which are sized between minimum and maximum size limits. Such intermediaries or customers may reject a consignment of crops delivered to them if a certain quantity and/or percentage of the delivered crops have conditions which lie outside of these specific limits. Therefore, it is known, after harvesting crops to sort the crop according to one or more set conditions prior to delivery of said crops to an intermediary or customer. However, this sorting is time consuming and, consequently, increases the expense of the delivered crops.

A further drawback of known automated methods of harvesting crops is that the initial investment in the equipment used for harvesting is not sufficiently offset by the savings experienced due to reductions in a wage-bills. Such a situation may be due to the equipment being inherently expensive and/or due to harvesting of crops at a rate which is insufficiently rapid compared to the rate at which they can be harvested by hand.

SUMMARY OF INVENTION

It is therefore a first non-exclusive object of the invention to provide a method, system and/or apparatus which overcomes or at least partially mitigates one or more of the above problems. It is a further non-exclusive object of the invention to provide a method, system and/or apparatus which harvests crops more efficiently, with a greater degree of selectivity and/or with reduced expense.

Accordingly, a first aspect of the invention provides a method for harvesting crops using a carriage provided with a harvesting device, the method comprising:
  a) locating the harvesting device at a crop to be harvested;
  b) actuating the harvesting device to harvest the crop; and
  c) moving the harvested crop away from the harvesting device by applying a pressure differential across the harvested crop.

Advantageously, moving the harvested crop away from the harvesting device in this manner means that the harvesting device does not need to travel to a store for storing the crop and may, instead, move more rapidly to a subsequent harvesting location. In this way, crops are harvested at a relatively more rapid rate. Moreover, moving the harvested crop by the application of a pressure differential thereacross allows crops to be moved away from the harvesting device with a reduced incidence of bruising or other damage caused by impact between the crop and other harvest apparatus.

The applied pressure differential across the harvested crop may comprise a positive or a negative pressure (e.g. a reduced pressure), for example the applied pressure differential across the harvested crop may be applied such that the harvested crop is pushed or pulled away from the harvesting device.

Applying the pressure differential across the harvested crop may comprise applying a pressure through a conduit fluidly connected to the harvesting device, e.g. to a cutting head of the harvesting device. The application of a pressure through the conduit may comprise actuating a pressure source, for example to draw or push fluid (e.g. air) away from the harvesting device. The applied pressure may be positive or negative.

One skilled in the art will appreciate that a crop plant comprises a crop to be harvested and ancillary crop plant parts, for example one or more of stalks, roots and/or additional foliage. In this specification where a crop is mentioned this refers to that part of a crop plant which is harvested or which may be suitable for harvest, and where the remaining crop plant is mentioned this refers to the unharvested or unsuitable ancillary crop plant part or parts.

For example, for crop plant members of the *brassica* family the crop plant may comprise a crop comprising a head or crown (comprising florets and trunks) and a portion of the stalk, whilst the remaining crop plant parts may comprise outer foliage and/or roots and/or at least a portion of the stalk. Consequently, for the *brassica* family, it may be advantageous to preferentially harvest the head or the head and a portion of the stalk.

The method may comprise a step d) of moving the harvesting device from the location at which the crop was harvested to a second location having a further crop to be harvested. Step d) may occur prior to, at least partially concurrent with, or subsequent to step c).

Applying the pressure differential across the harvested crop may move the harvested crop to or towards a store for harvested crops.

The method may comprise a step e) of decelerating the crop prior to its reaching a store. Decelerating the crop may comprise causing the crop to travel in a circular and/or spiral path. The circular and/or spiral path may be defined or provided on the inside of a container.

A further aspect of the invention provides an apparatus for harvesting crops, the apparatus comprising a carriage, a harvesting device and a crop movement apparatus, where the crop movement apparatus is configured or configurable, in use, to apply a pressure differential across one or more harvested crops at the harvesting device to thereby move the or each harvested crop away from the harvesting device.

A still further aspect of the invention provides an apparatus for harvesting crops, the apparatus comprising a carriage provided with a harvesting device, a ground height measuring device to measure or estimate the ground height at each harvested crop, a crop height measuring device to measure the height of a crop, a processor operatively connected to the ground height measuring device to generate baseline ground data and operatively connected to the crop height measuring device to determine a desired harvest height, a comparator to compare the baseline ground data to the desired harvest height to determine if a particular crop is to be harvested by the harvesting device.

The comparator may be provided by the processor. The processor and/or comparator may form at least a part of a controller or control system. Preferably, the controller or control system is mounted on the carriage.

A yet further aspect of the invention provides an apparatus for moving harvested crops away from a harvesting device, the device comprising a pressure source and a conduit having an inlet and an outlet, where the inlet is adapted to attach to a harvesting device and the outlet is located or locatable at a store for harvested crops, wherein the pressure source is arranged, in use, to apply a pressure differential across a harvested crop to thereby move the harvested crop away from the harvesting device and from the inlet to or towards the outlet.

The pressure source may comprise a negative pressure (e.g. reduced pressure) or a positive pressure source. Where a negative pressure source is provided, it may comprise a vacuum pump, for example which may be electrically powered. The pressure source may be automatically controlled. The conduit may comprise a seal at the inlet, e.g. for attachment to or attached to the harvesting device. The conduit may comprise a seal at the outlet, e.g. for attachment to or attached to the store or an intermediate body between the store and the conduit. The inlet of the conduit may be sealed or sealable in a fluidly tight manner to the harvesting device, e.g. to a cutting head of the harvesting device. The outlet of the conduit may be sealed or sealable in a fluidly tight manner to the store or an intermediate body between the store and the conduit.

The conduit may be formed from a flexible and/or resilient material, for example plastic. The conduit may be extendable between the inlet and outlet, for example the conduit may be configured to have a variable length, e.g. between the inlet and the outlet. The conduit may comprise a first end and a second end, for example and the inlet may be located at the first end and the outlet may be located at or adjacent the second end. The conduit may comprise one or more stiffening members along its length, for example configured or arranged to mitigate deformation of the conduit.

The apparatus may comprise a controller. The controller may be operatively connected to the pressure source and/or the harvesting device. The controller may be operable, in use, to alter the magnitude of pressure generated by the pressure source. The controller may be operable, in use, to determine when a crop has been harvested by the harvesting device. The controller may be operable, in use, to activate the pressure source prior to, during or subsequent to harvesting of a crop by the harvesting device. The controller may be operable, in use, to activate the pressure source when a crop has been determined to have been harvested. The controller may be operable, in use, to increase the magnitude of positive or negative pressure generated by the pressure source when a crop is about to be, has been or is being harvested, e.g. when it is determined that a crop is about to be, is being or has been harvested. The harvesting device may comprise a cutter or blade, for example operable to sever a crop from the remaining crop plant.

A further aspect of the invention provides an apparatus for measuring the distance travelled by a carriage, the apparatus comprising plural wheels for locomotion of the carriage, an encoder having an axle and a non-driven wheel for pulling, in use, across a surface over which the carriage is travelling, the non-driven wheel having a central axle which is connected to the axle of the encoder by a gear system arranged such that one 360 degree turn of the central axle of the non-driven wheel results in less than one 360 degree turn of the axle of the encoder.

The apparatus for measuring the distance travelled by a carriage may comprise a ground motion sensor. The or an apparatus for harvesting crops may comprise the apparatus for measuring the distance travelled by the carriage.

The gear system may be arranged so that the axle of the encoder completes one 360 degree turn when the non-driven wheel has rotated between 2 and 10 times, for example between 3 and 9 times, say between 4 and 8 times. The gear system may comprise a driver gear, e.g. attached or attachable to the central axle of the non-driven wheel. The gear system may comprise a driven gear, e.g. attached or attachable to the axle of the encoder. The gear system may comprise an intermediary or idler gear, e.g. arranged or arrangeable to transmit rotation of the driver gear to the driven gear.

The non-driven wheel may comprise a rim and a hub, for example which may be joined by spokes. The non-driven wheel may comprise one or more projections extending from its rim, e.g. from the periphery of its rim. The or each projection may be configured to bite into or press against a surface over which the non-driven wheel is rolled, in use. The or each projection may extend away from the rotational axis of the non-driven wheel. The or each projection may have a curved and/or bent distal or free end. The or each projection may be formed from the same or a different material as the rim of the non-driven wheel the or each projection may be integrally formed with the rim of the non-driven wheel or may be attached or attachable to the rim of the non-driven wheel. The or each projection may be formed from a rigid or semi-rigid material. The or each projection may have a first end proximal to the rim of the non-driven wheel and a second end distal from the rim of the non-driven wheel. The or each projection may curve or bend between its first and second ends.

Where plural projections are provided they may be provided in an array on the rim of the non-driven wheel. Projections within the array may be evenly distributed or un-evenly distributed, e.g. around the rim of the non-driven wheel.

The apparatus for measuring the distance travelled by a carriage may comprise an arm. The arm may be attached or attachable at a first end to the non-driven wheel, e.g. to the central axle of the non-driven wheel. The arm may be attached or attachable (for example pivotably attached or attachable) at a second end to a or the carriage.

According to a yet further aspect of the invention there is provided an apparatus for harvesting crops, the apparatus comprising a receptacle configured to receive at least a portion of a crop during harvesting thereof, the receptacle being formed of first and second parts, where the first and second parts are attached together by a connection configured to fail if the second part is impacted with a force sufficient to cause damage to the first part.

Advantageously, the receptacle and/or further components of the apparatus for harvesting crops (e.g. a robot arm connected to the receptacle) may be at least partially protected from damage due to impact forces against the receptacle. Deformation and/or separation of the first part from the second part has been found to at least partially mitigate transmission of the energy of impacts against the first part to the second part of the receptacle and/or to further components of the apparatus attached to the receptacle.

The connection may be frangible. The connection between the first and second part may comprise one or more shear bolts or pop-rivets. The connection may be a fused or weakened connection. By a fused connection, the skilled person will understand that the connection is deliberately formed such that it provides the point of failure between the first and second parts if subjected to an impact force sufficient to damage the second part and/or further components attached to the receptacle. The first part may be configured to sacrificially deform and/or separate from the second part in the event of an impact against the first part. The first part may be releasably attached to the second part.

The first and second parts may be formed from different materials. The first part may be formed from plastic. The second part may be formed from metal, e.g. aluminium. The first part may be formed from a material which is more ductile and/or brittle and/or less strong than is the material from which the second part is formed The first part may comprise a front portion of the receptacle, e.g. a portion of the receptacle at the front thereof in a direction of motion of the receptacle, in use (for example motion towards a crop to be harvested). The first part may comprise a lower portion of the receptacle, e.g. a portion of the receptacle adjacent or nearer to the ground, in use.

A yet further aspect of the invention provides a method of harvesting crops using a carriage provided with a harvesting device, the method comprising:
a) harvesting plural crops using the harvesting device;
b) measuring or estimating the ground height at each harvested crop in order to generate baseline ground data;
c) determining a height of a subsequent crop to determine a desired harvest height; and d) comparing the baseline ground data to the desired harvest height to decide whether to harvest the subsequent crop.

Advantageously, the harvesting device may thereby be protected from fouling against the ground and may therefore be protected from being damaged thereagainst. Moreover, a relatively increased percentage of crops may be harvested using the above described method.

The generated baseline ground data may comprise average ground height data and/or variations in ground height, e.g. topographical changes such as sloping of the ground.

The method may comprise a step e) of preventing the harvesting device from harvesting the subsequent crop if the comparison of the baseline ground data to the desired harvest height is negative, e.g. produces a result less than of a threshold value.

The method may comprise a step f) of harvesting a crop if the comparison of the baseline ground data to the desired harvest height is positive, e.g. produces a result greater than a threshold value.

A further aspect of the invention provides an apparatus for harvesting crops, the apparatus comprising a cutting means and a receptacle configured or configurable to receive at least a portion of a crop and comprising a leading edge, where, in use, the cutting means is arranged to sever a crop from the remaining crop plant at a location downstream of and spaced from the leading edge by a distance of between 5 and 50 mm.

Advantageously, by severing the crop from the remaining crop plant at a location relatively close to the leading edge of the receptacle an increased number of crops can be harvested without fouling the ground whilst continuing to conform to the height requirements (of the crop stalk) required by consumers and/or wholesalers.

The leading edge of the receptacle may be a lower edge, in use, of the receptacle.

The cutting means may be arranged to sever the crop from the remaining crop plant at a location spaced from the leading edge by a distance of between 10 and 40 mm, for example between 10 and 30 mm, e.g. between 10 and 20 mm.

The receptacle may comprise a cutting aperture through its thickness. The cutting means may be arranged to sever the crop from the remaining crop plant through the cutting aperture (at least partially through the cutting aperture). The cutting aperture may be spaced from the leading edge of the receptacle by any of the above-described distances.

The cutting means may comprise a cutter, for example one or more blades. The cutter may be formed from metal. The cutting means may be operable to reciprocate into and/or across an interior volume of the receptacle. Where a cutting aperture is provided the cutting means may be operable to reciprocally extended through and be retracted from the cutting aperture, e.g. into an interior volume of the receptacle.

A yet further aspect of the invention provides an apparatus for harvesting crops, the apparatus comprising a robot arm comprising a hydraulic control system, whereby the hydraulic control system of the robot arm is attached or configured to be attached to the hydraulic system of a vehicle.

The vehicle may be a farm vehicle, for example a tractor. The vehicle may be a construction vehicle, for example an excavator.

A yet further aspect of the invention provides an apparatus for harvesting crops, the apparatus comprising a robot arm comprising an electronic control system and a cutter, where the apparatus is attached or configured to be attached to an external electrical system (e.g. an independent electrical system) for powering the cutter.

In embodiments, the external electrical system may be a 12-volt electrical system.

For the avoidance of doubt, any of the features described herein apply equally to any aspect of the invention. Moreover, any of the aspects may include features from one or more of any of the other aspects.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one aspect or embodiment of the invention are applicable to all aspects or embodiments, unless such features are incompatible.

BRIEF DESCRIPTION OF THE DRAWINGS

Embodiments of the invention will now be described by way of example only with reference to the accompanying drawings in which.

DESCRIPTION OF THE INVENTION

Figure 1:
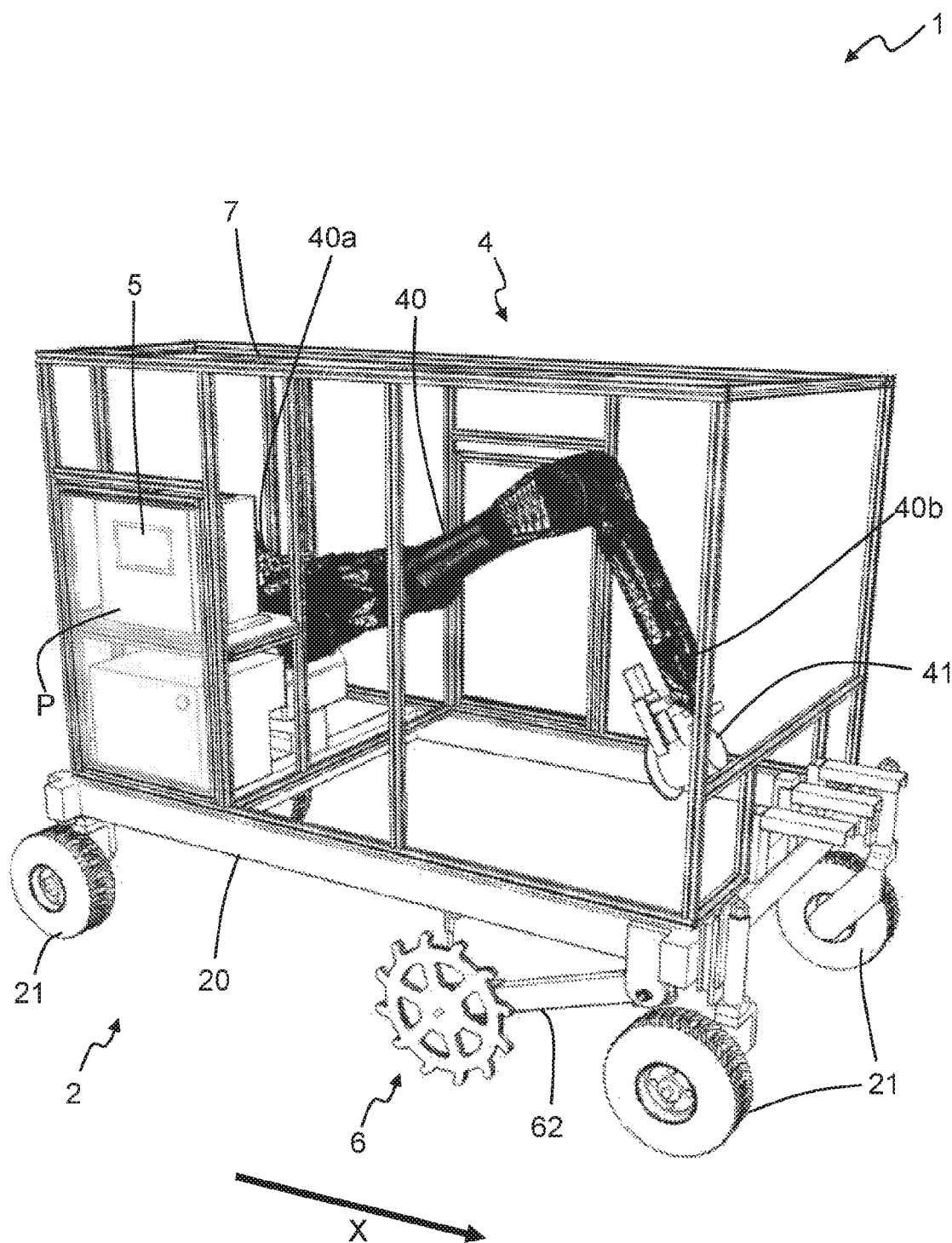
FIG. 1 is a perspective view of a harvesting apparatus according to an embodiment of the invention.
Figure 2:
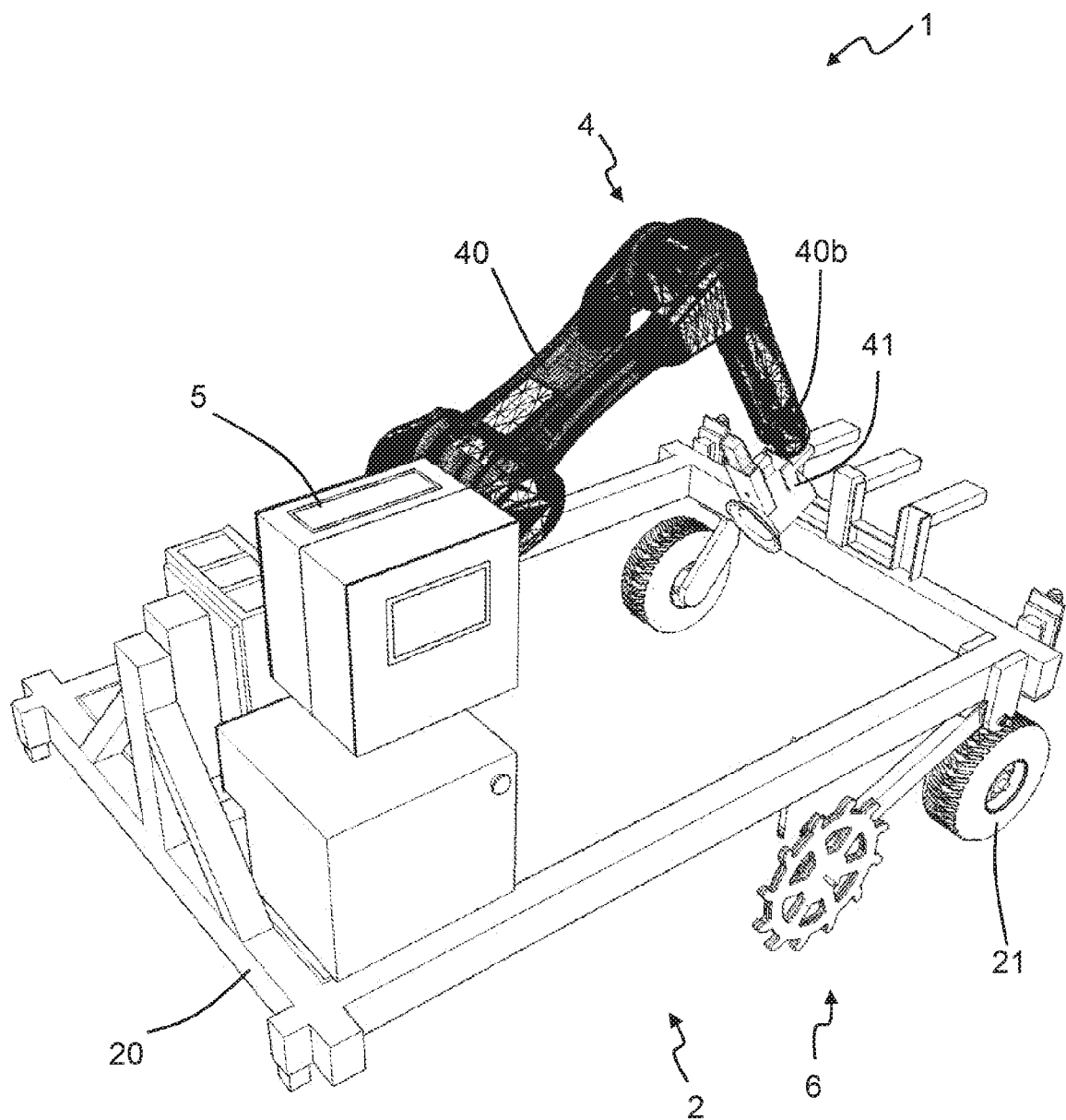
FIG. 2 is a perspective view of the apparatus shown in FIG. 1 absent its enclosure and rear wheels.

Referring now to FIGS. 1 and 2, there is shown a harvesting apparatus 1 according to an embodiment of the invention. The harvesting apparatus 1 includes a carriage 2 comprising a frame 20 with wheels 21. A camera station 3 (shown in FIG. 9), a harvesting device 4, a control system 5, preferably comprising a processor P, and a ground motion sensor 6 are secured to the carriage 2. An enclosure 7 is arranged to cover the components on the carriage 2 and is secured thereto.

In use, the carriage 2 is attached to the front end of a vehicle (not shown), which in this embodiment is a tractor.

Prior to use in a field of crops the harvesting apparatus 1 is attached to the front of the tractor via a coupling which provides a secure and detachable connection thereto. For conveyance of the harvesting apparatus 1 between different fields of crops it may be convenient to detach the harvesting apparatus 1 from the front of the tractor and to attach the harvesting apparatus 1 to the rear of said tractor via the same coupling or a further coupling (not shown), instead. The coupling (and further coupling, where provided) may be configured or configurable to lift the harvesting apparatus 1 clear of the ground over which it is disposed.

It will be appreciated by one skilled in the art that the harvesting apparatus 1 is primarily (although not exclusively) intended for outdoor use and, consequently, the materials from which the various component parts are formed are therefore chosen in order to resist corrosion due to exposure to environmental factors such as rain. Furthermore, the materials are selected in order to provide sufficient rigidity and strength to the thus formed components. Additionally, the various components, in particular components including electrical aspects, are selected in order that they remain operational across a suitable range of temperatures.

The harvesting device 4 is located on the harvesting apparatus 1 such that it is downstream of the camera station 3 when the harvesting apparatus 1 is in use, e.g. in motion in a harvesting direction, as indicated by arrow X in FIG. 1.

Figure 9:
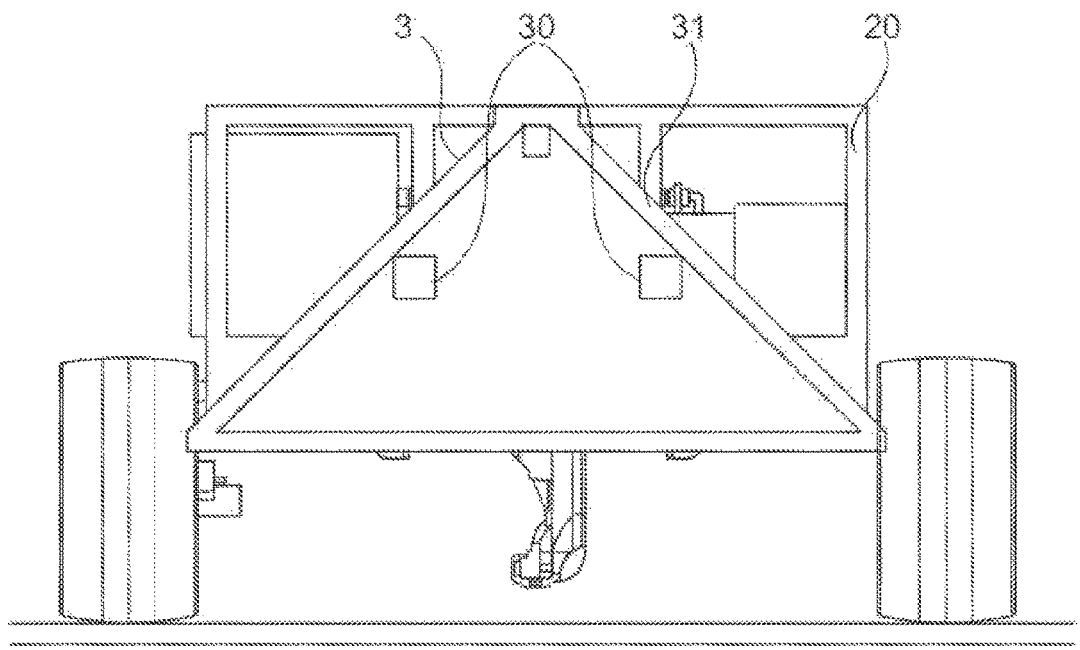
FIG. 9 is a partial end view of the harvesting apparatus shown in FIG. 1.

The camera station 3 (as shown in FIG. 9) includes image capture means 30 which comprises two cameras 30. The two cameras 30 are spaced apart by any suitable distance and are located at a height above a surface (e.g. the ground), which is relatively underneath the harvesting apparatus 1. The height is configured such that the field of view of the two cameras 30 encompasses a suitable viewing area. Together the two cameras 30 are configured to capture a broad view of the surface over which the carriage 2 is travelling, in use. In this way, the location and height of crops is able to be more readily and effectively determined.

The harvesting device 4 includes a robot arm 40 and a cutting head 41. The robot arm 40 has a first, securement end 40a, secured to the carriage 2, and a second, free end 40b to which the cutting head 41 is attached. The robot arm 40 has its own power supply, in this embodiment. However, in embodiments, the drive system of the robot arm 40 may be fluidly connected to the hydraulic system of the tractor, and the hydraulic system of the tractor may provide the motive force for moving the robot arm 40, in use.

The cutting head 41 (as shown in more detail in FIGS. 7 and 8) includes a receptacle 42 for receiving at least part of a crop during harvest thereof. The receptacle 42 is cylindrical in shape and has a hollow interior. The interior diameter of the receptacle 42 is selected to be greater than the maximum desired size of crop. The walls of the cylinder may be selected to be thin so that the receptacle 42 is slim-line, especially at or adjacent the lower (in use) end 42a thereof.

Although a deflector in the form of a skirt may be provided at the lower end 42a of the receptacle 42, it has been found that an outer surface free of such a skirt allows more efficient harvesting of crops. Without wishing to be bound by any particular theory, it is believed that such a thin walled receptacle 42 absent a skirt deflector more readily engages between the head of a crop and any foliage or other unwanted objects thereabout. In this way, it has been found that use of such a slim-line receptacle 42 results in the harvesting of a relatively reduced quantity of undesirable detritus and foliage (crop foliage or otherwise) along with harvested crops. Post-processing of harvested crops is therefore more rapid and less expensive than is the case using alternative forms of receptacle.

Figure 7:
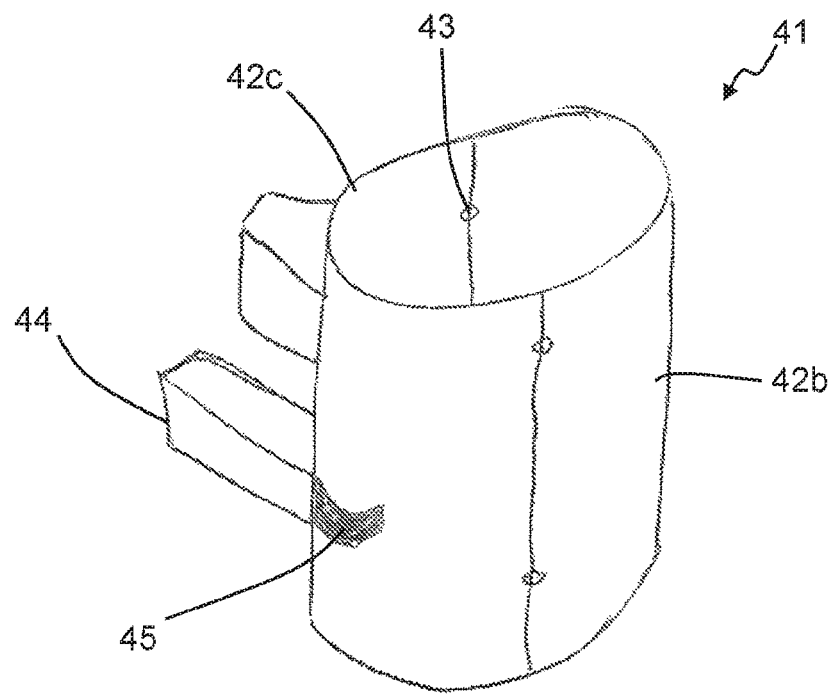
FIG. 7 is a perspective view of the cutting head shown in FIG. 1.

The receptacle 42 is defined by first and second parts 42b, 42c which are joined together (as shown in FIG. 7) by a connection 43 which is provided by shear bolts 43 in this embodiment.

The first part 42b is formed from plastic, whilst the second part 42c is formed from aluminium and is attached to the robot arm 40. The shear bolts 43 are configured to fail if an impact force is applied to the first part 42b which would be sufficient to damage the second part 42c and/or the robot arm 40 to which it is attached. In this way, the first part 42b may be sacrificed if the receptacle 42 is impacted (for example against a rock) instead of the impact force being transmitted through the receptacle 42 to the more expensive robot arm 40 to which it is attached. Furthermore, the second part 42c of the receptacle 42 may be protected from impact damage in this way, also. Additionally or alternatively, the first part 42b may be configured to at least partially deform or crumple when impacted in order to absorb energy of the impact and thereby protect the second part 42c of the receptacle 42 and/or the robot arm 40 to which it is attached. As will be appreciated, the first part 42b is located at a front (in the direction of motion of the carriage 2, in use) portion of the receptacle 42. In embodiments, however, the first part 42b may comprise a lower portion (e.g. closer to the ground, in use) of the receptacle 42.

A cutting apparatus 44 including a blade (not shown) is attached to the side of the receptacle 42 adjacent a cutting aperture 45 in the receptacle 42. The cutting apparatus 44 includes a piston which is operable, in use, to drive the blade through the cutting aperture 45 into the receptacle 42 in order to harvest a crop. The cutting aperture 45 is located at a closely spaced distance d from the leading edge 42d of the receptacle 42. The cutting aperture 45 is spaced from the leading edge 42d of the receptacle 42 by a distance d of between 5 and 50 mm, say between 10 and 30 mm, for example between 10 and 20 mm. Advantageously, by locating the cutting aperture 45 relatively close to the leading edge 42d of the receptacle 42 an increased number of crops can be harvested. This is because crops may be cut relatively nearer to the ground and, accordingly, crops with relatively shorter stalks may therefore be cut when using a receptacle 42 having a cutting aperture 45 in the above-described location, without fouling on the ground.

The control system 5 is operatively connected to the cameras 30, the harvesting device 4 and the ground motion sensor 6 by a wireless or wired connection. The control system 5 includes memory and a processor. A database of crop image data is stored on the memory. In embodiments, the control system 5 may be operatively connected to a remote server which may have at least a portion of the database of crop image data stored thereon.

Figure 3:
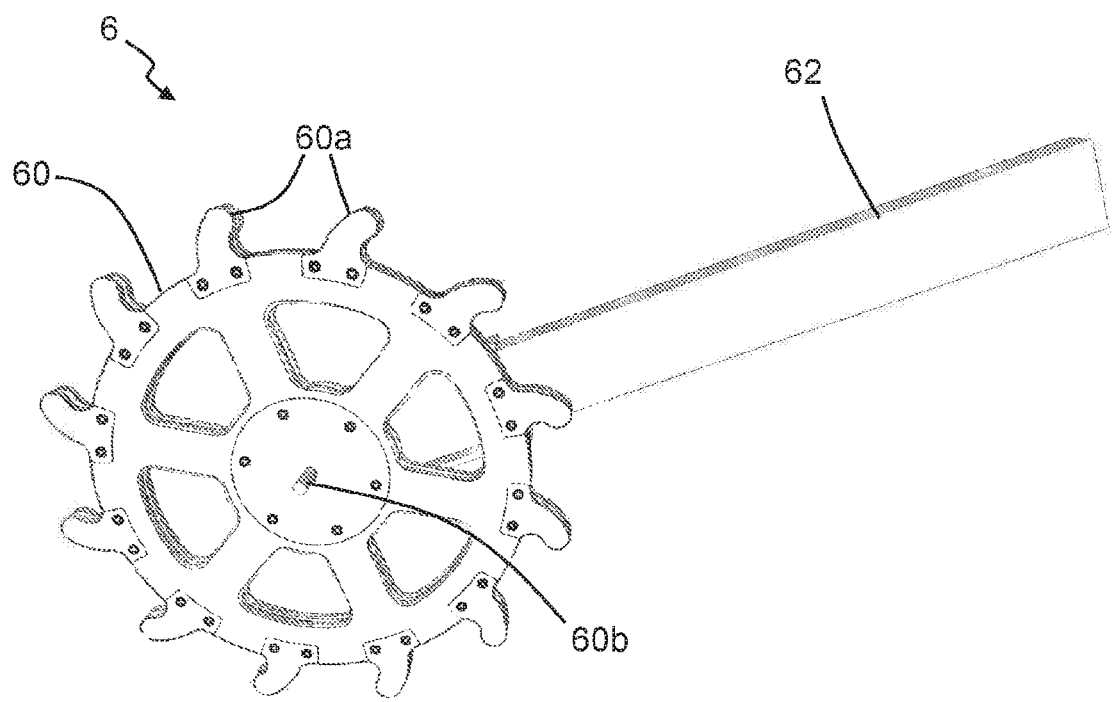
FIG. 3 is a side view of the distance measuring apparatus shown in FIG. 1.

The ground motion sensor 6 (as shown in more detail in FIGS. 3 to 5) includes a non-driven wheel 60 and an encoder 61, which is a pulse coder 61 in this embodiment. The central axle 60b the non-driven wheel 60 is attached to a support arm 62. One end of the support arm 62 is pivotably attached to the frame 20 of the carriage 2 (see FIG. 1). A potentiometer (not shown) is arranged to measure, in use, the relative angular movement of the support arm 62 with respect to the frame 20 to which it is attached. In embodiments, it will be appreciated that in addition or as an alternative to the potentiometer any other suitable sensor for measuring deflection may be used.

The non-driven wheel 60 includes a rim and a hub, joined together by a plurality of spokes. Plural projections 60a extend from the periphery of the rim. Each projection 60a extends away from the central axle 60b of the non-driven wheel 60 and has a first end at the rim and a second, free end distal from the rim. Each projection 60a has a bend between its first and second ends. The second, free end of each projection 60a is rounded. In use, the non-driven wheel 60 is arranged such that each projection 60 bends away from the direction in which the non-driven wheel 60 will be rolled over a surface.

We have found that use of projections 60a of the above-described type on the periphery of the non-driven wheel 60 advantageously reduces slippage of the non-driven wheel 60 relative to a surface over which it is rolled. Such an advantageous effect is particularly noticeable when the non-driven wheel 60 is pulled over stony and/or muddy ground. The projections 60a aid with ensuring that the non-driven wheel 60 maintains contact with the ground whilst helping to prevent it from sinking into the ground. Accordingly, the distance travelled by the carriage 2 from a starting datum is more accurately measured. This enables the location of identified crops to be more accurately calculated and for the harvesting device 4 to be controlled to move the cutting head 41 to a more accurate position over the identified crop. Harvesting of crops is therefore more effective, with less damage to said harvested crops due to misalignment of the cutting head 41 and the identified crop. Therefore, the percentage of useable harvested crops is relatively increased through use of such a ground motion sensor 6.

The encoder 61 includes a rotatable axle 61a which is connected to the central axle 60b of the non-driven wheel 60 by a gear system 62. The gear system 62 includes a driver gear 62a attached to the central axle 60b of the non-driven wheel 60, a driven gear 62b attached to the rotatable axle 61a of the encoder 61, and an idler gear 62c transmitting rotational movement from the driver gear 62a to the driven gear 62b. The gear ratio of the gear system 62 is 7:1, in this embodiment (but may be 7.2:1 in embodiments). Which is to say, that the gear system 62 is arranged such that the rotatable axle 61a of the encoder 61 rotates once for every 7 rotations of the central axle 60b of the non-driven wheel 60. However, in embodiments, the gear ratio of the gear system 62 may be between 2:1 and 10:1, for example between 3:1 and 9:1, say between 4:1 and 8:1.

Advantageously, use of the gear system 62 allows a more accurate measurement of the distance travelled by the carriage 12 to which the ground motion sensor 6 is attached. Using the above-described gear ratio of 7:1, the encoder 61 is configured to provide 77 pulses for every 1 mm of travel by the carriage 12, whilst absent the gear system 62 only 11 pulses for every 1 mm of travel by the carriage 12 are provided. Accordingly, the distance that the carriage 12 has travelled, from a starting datum, is more accurately measured than would be the case absent the gear system 62, with all of the attendant benefits described above in respect of the projections 60a on the rim of the non-driven wheel 60.

The enclosure 7 is configured to protect the cameras 30 from interference by external light sources. In this respect the enclosure 7 may be formed from non-transparent materials in order to at least partially mitigate against external light becoming incident on the image capture means 30.

In use the, harvesting apparatus 1 is transported over a site to be harvesting by the tractor in the direction of arrow X in FIG. 1. The cameras 30 capture image data within their field of view and transmits the captured image data to the control system 5. The captured image data is then compared with the database of crop image data stored in the control system 5 in order to determine whether one or more crops are present.

When a first crop is identified in the captured image data a computer program, running on the control system 5, calculates the size of the first crop, for example based upon length, width and/or height, which is calculated from the captured image data transmitted to said control system 5. The size of the first crop is then compared with a pre-set range of sizes for harvestable crops.

A computer program, running on the control system 5, may generate a stereoscopic image from the received captured image data from the two cameras 30.

The computer program, running on the control system 5, calculates location data for the first crop relative to the cameras 30 and hence relative to the datum of the frame 20. The location data comprises 3D location data, for example X and Y coordinates relating to the transverse and longitudinal location of the crop relative to the datum and a Z coordinate corresponding to the height of the first crop relative to the datum.

The relative position of the cameras 30 with respect to a datum position of the frame 20 is stored in the memory. Additionally, a starting height of the lowermost part of the non-driven wheel 60 with respect to the or a datum position of the frame 20 is also stored in the memory. A relative starting position of the second, free end 40b of the robot arm 40 and/or the cutting head 41 with respect to the or a datum position of the frame 20 is also stored in the memory.

The control system 5 then calculates the velocity of the harvesting apparatus 1 relative to the ground via motion data gathered from the ground motion sensor 6 in order to generate velocity data. When the non-driven wheel 60 rotates over the ground underneath the harvesting apparatus 1 the encoder 61 determines the angular displacement of the non-driven wheel 60 at known times, which corresponds to motion data. The control system 5 converts this motion data into velocity data by calculating the angular displacement over a given time period. The control system 5 then utilizes the location data and the velocity data in order to generate accurate positioning data.

If the size of the first crop is within a range deemed suitable for harvesting (for example, greater than a pre-set minimum size and less than a pre-set maximum size—e.g. within a pre-set range of harvestable sizes) then the control system 5 controls the robot arm 40 to move the cutting head 41 to the location of the crop based upon the positioning data. If the size of the first crop is outside of a range deemed suitable for harvesting (for example greater than a pre-set maximum size or less than a pre-set minimum size—e.g. outside of a pre-set range of harvestable sizes), which we call 'rejected crops', then the control system 5 does not control the robot arm 40 to move the cutting head 41 to the location of the crop. In either circumstance, the control system 5 continues to compare captured image data from the cameras 30 with the database of crop image data stored in the control system 5.

When the control system 5 has controlled the robot arm 40 to move the cutting head 41 to the location of the first crop, the cutting head 41 is positioned so that the opening of the receptacle 42 is directly adjacent said crop. The robot arm 40 is then commanded to move the receptacle 42 over the crop so that a desired portion of the first crop is located within said receptacle 42. The desired portion of the crop may relate to a specific height which may correspond to one or more measured characteristics of the first crop and/or to the measured size, e.g. height, of said first crop. The cutting head 41 is lowered onto the first crop so that it passes into the receptacle 42 through the opening. Simultaneously, the lower end 42a of the receptacle 42 pushes foliage, stones or other detritus away from the crop.

Once the desired portion of the crop is within the receptacle 42 the cutting apparatus 44 is actuated by the control system 5 to deploy the blade through the cutting aperture 45, slicing through part of the crop and thereby severing the desired portion of the crop from the remainder of the crop plant.

Figure 6:
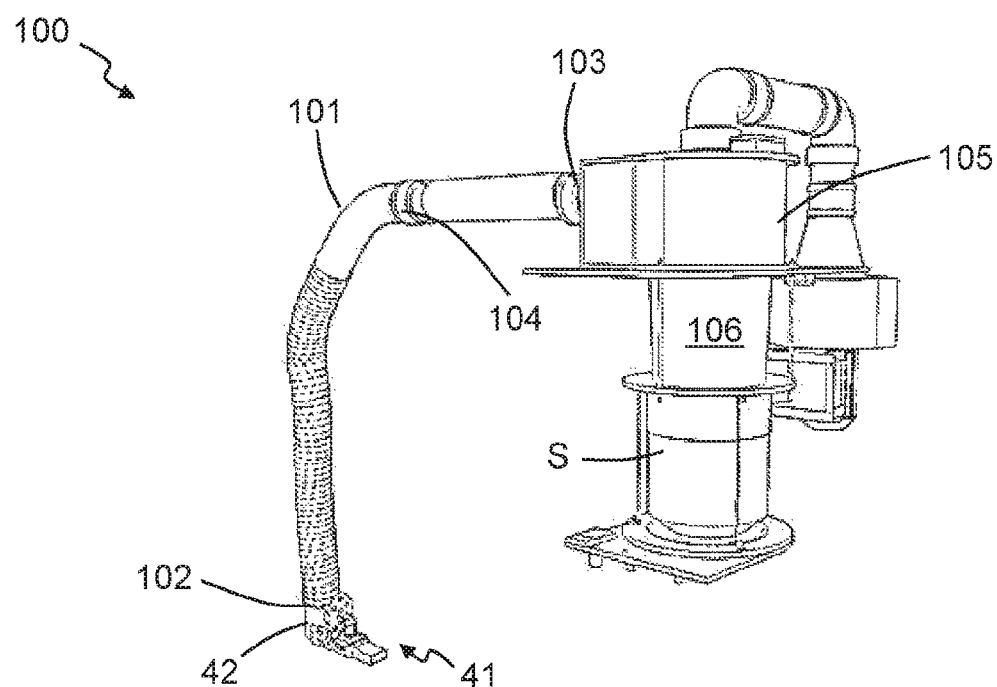
FIG. 6 is a side view of a transport apparatus according to a further embodiment of the invention for use with the harvesting apparatus shown in FIG. 1.

Once cut the crop is then moved away from the cutting head 41 to a store S by the crop movement apparatus 100 shown in FIG. 6. The crop movement apparatus 100 includes a conduit 101 formed from an at least partially flexible and resilient material such as plastic and having an inlet 102 and an outlet 103. The conduit 101 includes support members 104 in the form of rigid hoops 104 spaced along its length and configured to at least partially mitigate against deformation or collapse of the conduit 101, e.g. in use. The inlet 102 includes a connection adapted to fluidly connect in an at least-partially sealing manner to the top end of the receptacle 42 of the cutting device 41. The outlet 103 is fluidly connected to a container 105. A reduced pressure source 106 is located within the interior of the container. In this way the reduced pressure source 106 is in fluid communication with the conduit 101 (via the outlet 103). In embodiments, however, the reduced pressure source 106 may be located at least partially outside of the container 105 and is arranged to fluidly communicate with the interior of the container 105.

The container 105 is located above the store S, which is secured to the carriage 2 (not shown in FIG. 6), in this embodiment. In embodiments, however, the store S may be secured to a separate carriage or the store S may be absent entirely. In the absence of a store S, harvested and moved crops may be collected from a position on the field, subsequently, e.g. in a further operation.

In use, once a crop has been severed from the remains of the crop plant by the blade the reduced pressure source 106 applies a suction force to the harvested crop. The crop is then drawn away from the cutting head 41, through the inlet 102 of the conduit 101, along the conduit 101 and out of the outlet 103 into the container 105. The container 105 has a curved inner surface configured to guide the crop around its inner surface in a spiral path and to thereby gradually decelerate the crop's velocity as it drops towards the floor of the container 105 under the force of gravity. The decelerating crop can then fall through an aperture (not shown) through the thickness of the floor of the container 105 and into the store S. By reducing the crop's velocity in this fashion the probability of damage to the crop due to impact with other crops or the interior of the apparatus is relatively reduced.

The reduced pressure source 106 is operatively connected to the control unit 5. In use, the control unit 5 operates the reduced pressure source 106 to increase the generated magnitude of reduced pressure when it has determined that a crop is about to be harvested. If a harvested crop has been drawn to the store S and a further crop is not about to be harvested then the control unit 5 operates the reduced pressure source 106 to reduce the generated magnitude of reduced pressure. In this way, harvested crops are efficiently and rapidly drawn away from the cutting head 41 to the store S whilst energy efficiency vis-a-vis the reduced pressure source 106 is enhanced.

Advantageously, use of such an apparatus 100 for moving harvested crops away from the cutting head 41 allows relatively more rapid harvesting of crops. This is because the cutting head 41 does not have to move from to or toward the store S from the location of the harvested crop and then back to the next crop to be harvested. Instead, the cutting head 41 may be moved directly from the location at which the crop was harvested to the location of the next crop to be harvested. In this way, the overall efficiency and speed of harvesting is relatively increased. Accordingly, the cost efficiency of harvesting using such an apparatus 100 and method is relatively improved.

Figure 10:
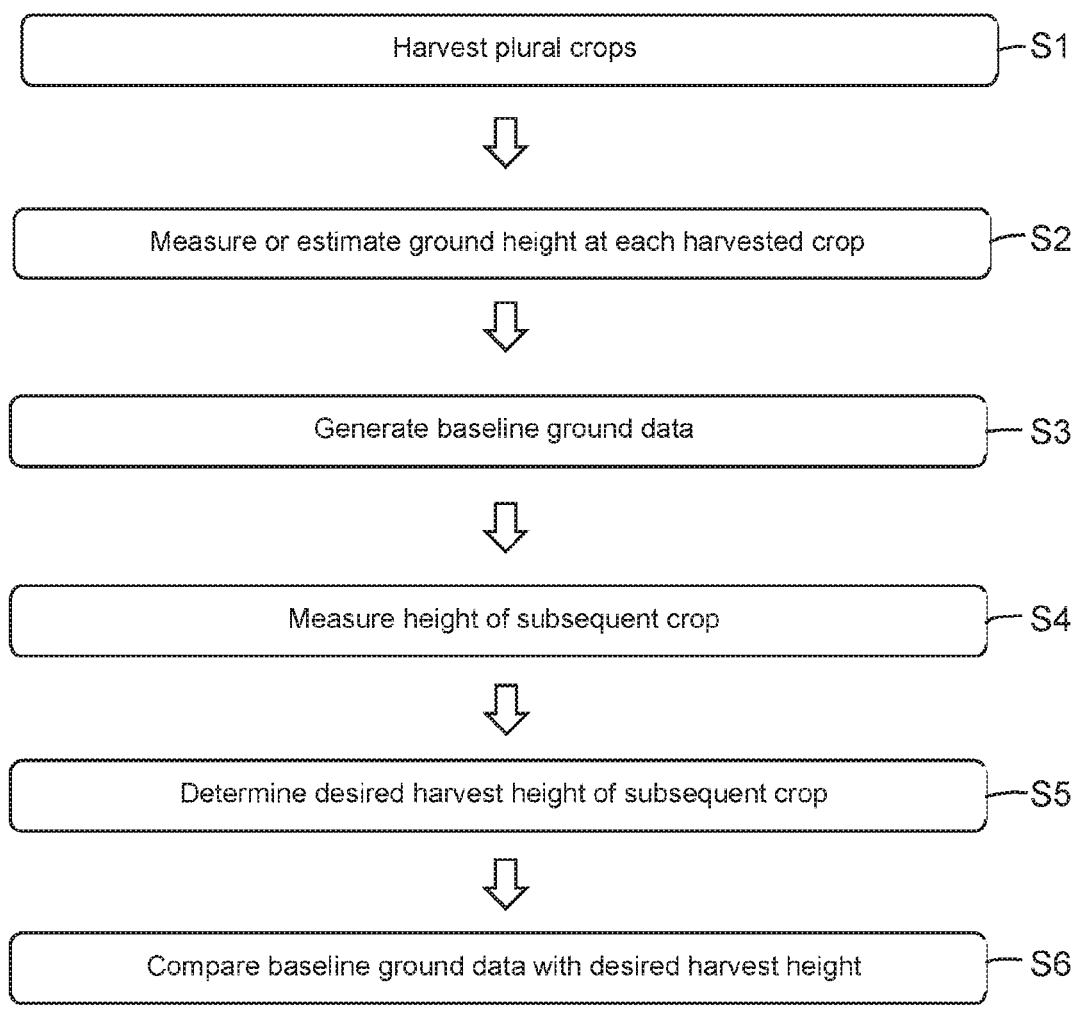
FIG. 10 is a flow chart of a method of harvesting crops according to an embodiment of the invention.

Referring now to FIG. 10, a further method of harvesting crops is shown. The method comprises harvesting plural crops in a first step S1. The ground height at each harvested crop is estimated or measured at a second step S2. This may be measured by the cameras 30. Based on the measured or estimated ground height baseline ground data is generated by a processor of the control system 5 in a step S3. The baseline ground data comprises an estimated topography and/or height of the ground forward (in the direction of travel of the carriage 2) of the plural harvested crops. The topography may relate to relative sloping of the ground. When a subsequent crop is identified, the height of the subsequent crop is determined in a step S4, for example by the cameras 30. A desired harvest height of the subsequent crop is determined from the determined height of the subsequent crop, in a step S5, for example by using the controller 5 to subtract from the crop height data the desired crop length. The baseline ground data is compared with the desired harvest height to determine whether or not to harvest the subsequent crop, in a step S6. If the comparison of the baseline ground data to the desired harvest height is less than a threshold value as determined by the processor of the controller or control system 5, then the crop is not harvested S6. If, however, the comparison of the baseline ground data to the desired harvest height exceeds the threshold value then the crop may be harvested. The threshold value is selected such that the cutting head may be positioned to cut the crop without fouling on the ground. Furthermore, the threshold value is selected such that a harvested crop has physical characteristics, e.g. a height of crown and stalk, which are within acceptable dimensions for end consumers.

Figure 11:
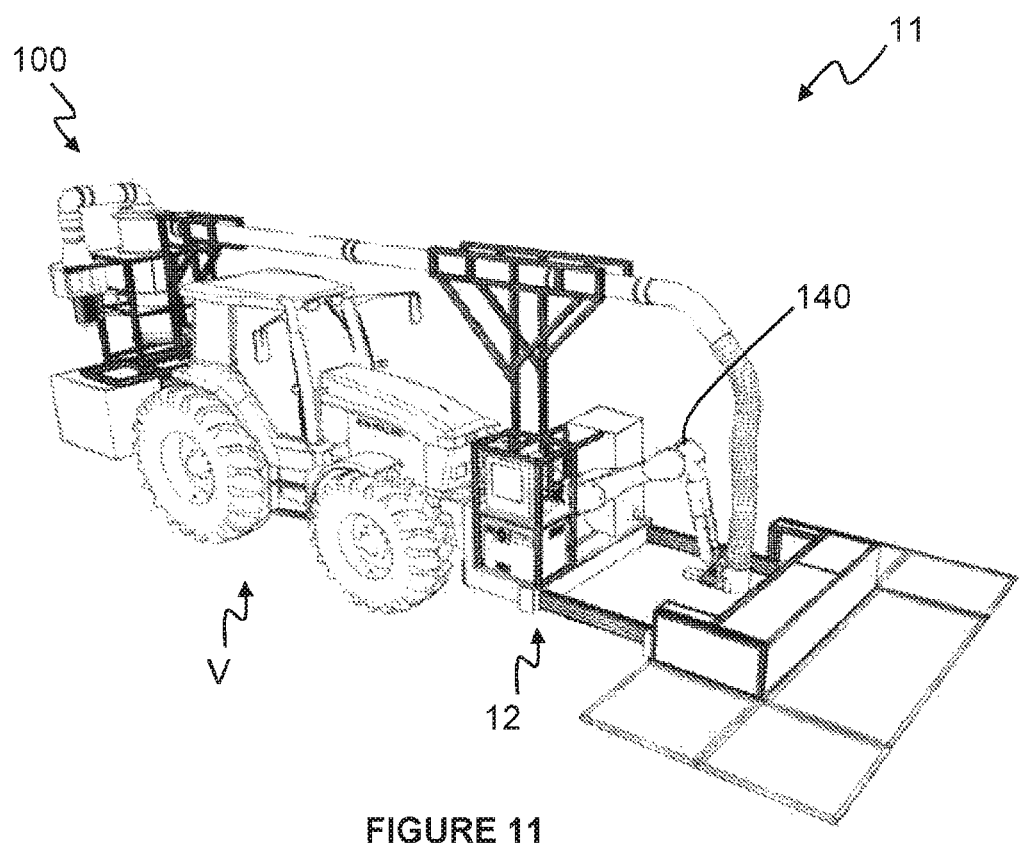
FIG. 11 is a perspective view of a harvesting apparatus according to a further embodiment of the invention.
Figure 12:
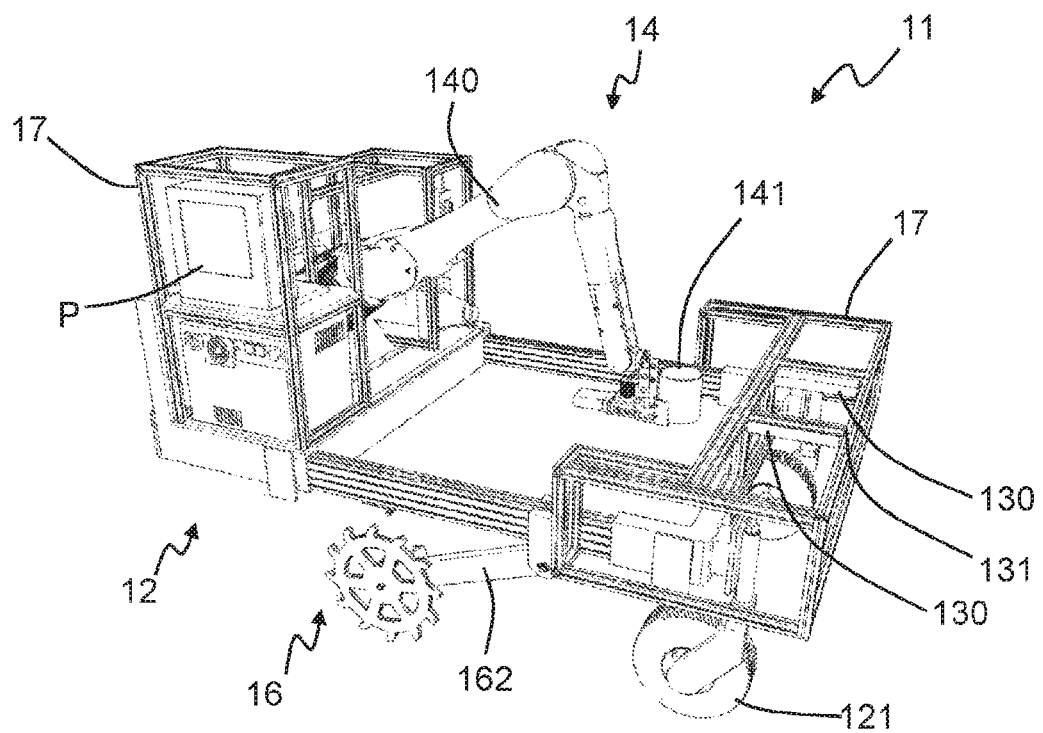
FIG. 12 is a perspective view of the apparatus of FIG. 11 absent its vehicle and crop movement apparatus.

Referring now to FIGS. 11 and 12, there is shown a harvesting apparatus 11 according to an alternative embodiment of the invention, wherein like features to those shown in the harvesting apparatus 1 shown in FIGS. 1 and 2 are denoted by like features preceded by a '1', which will not be described herein further. The harvesting apparatus 11 shown in FIGS. 11 and 12 differs from that shown in FIGS. 1 and 2 in that the enclosure 17 is not arranged to cover all of the components of the carriage 12. Additionally, the shape of the frame 131 supporting the cameras 130 is rectangular in end view, rather than the triangular in end view of the frame 31 supporting the cameras 30 of the harvesting apparatus 11. Furthermore, FIG. 11 shows the harvesting apparatus 11 connected to a vehicle V and with a crop movement apparatus 100 attached to both the harvesting apparatus 11 and the vehicle V.

Figure 4:
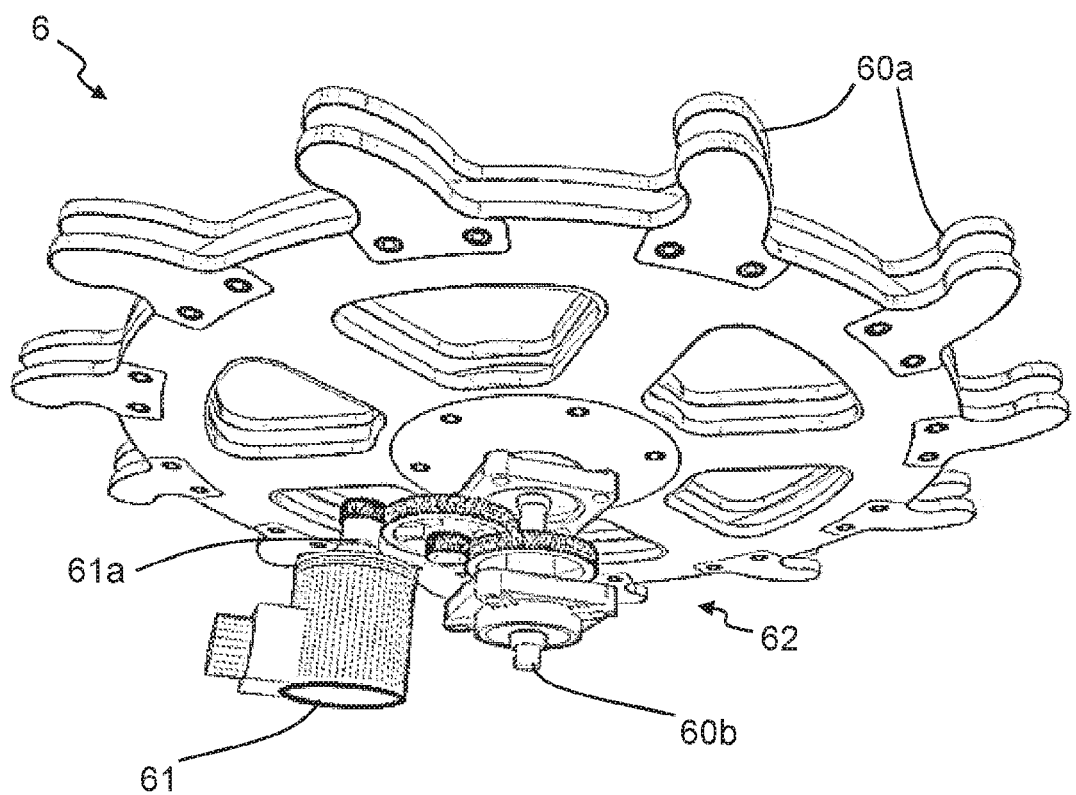
FIG. 4 is a perspective view of the reverse side of the distance measuring apparatus shown in FIG. 1, absent the arm.
Figure 5:
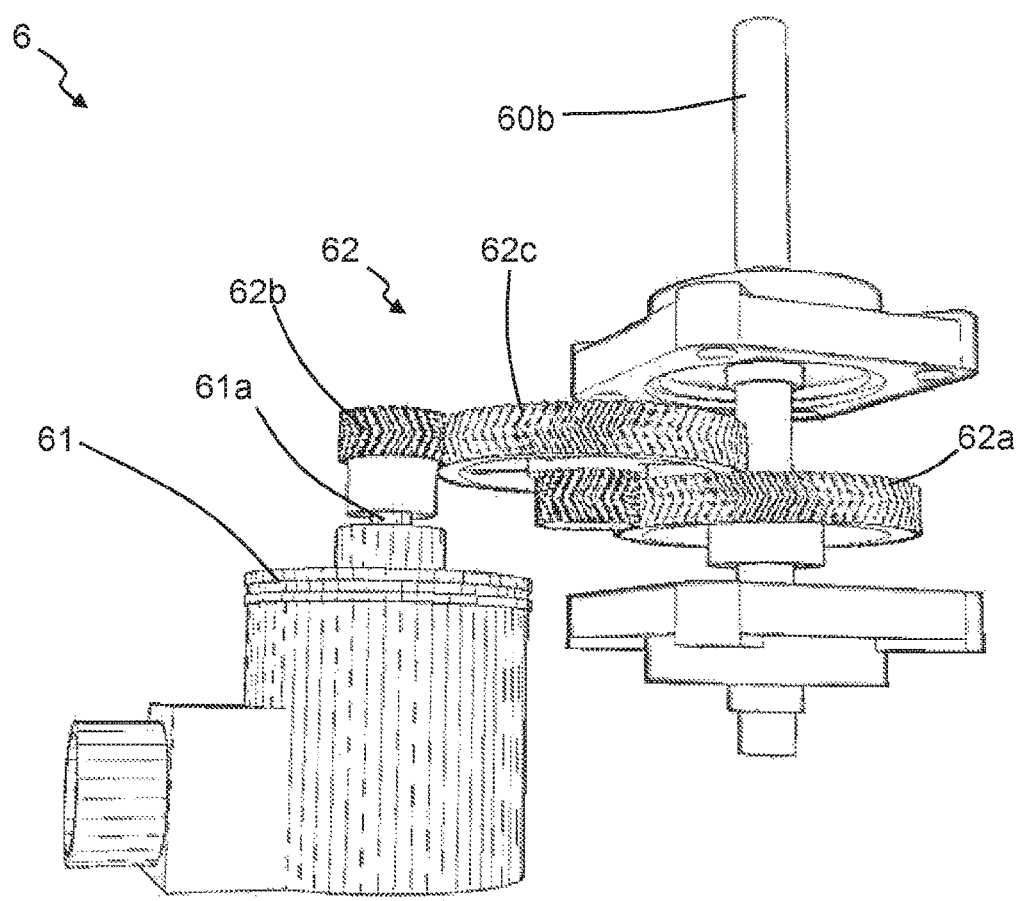
FIG. 5 is top view of the distance measuring apparatus shown in FIG. 1, absent the wheel.
Figure 13:
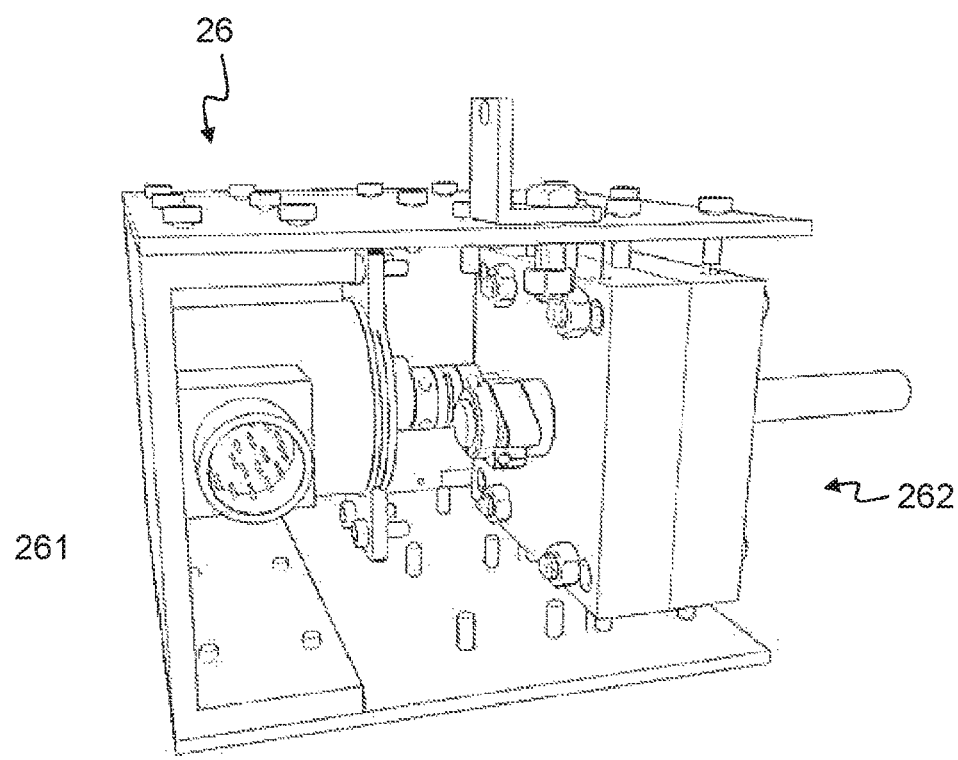
FIG. 13 is a perspective view of a distance measuring apparatus according to an alternative embodiment of the invention, absent the wheel and arm.

Referring now to FIG. 13, there is shown a ground motion sensor 26 according to an alternative embodiment of the invention, wherein like features to those shown in the ground motion sensor 6 shown in FIGS. 4 and 5 are denoted by like features preceded by a '2', which will not be described herein further. The ground motion sensor 26 shown in FIGS. 14 and 15 differs from that shown in FIGS. 4 and 5 in that the ground motion sensor 26 comprises a gearbox system 262 which is enclosed. As will be appreciated, the ground motion sensor 26 is shown in FIG. 14 absent a wheel and arm for ease of viewing, only.

Figure 8:
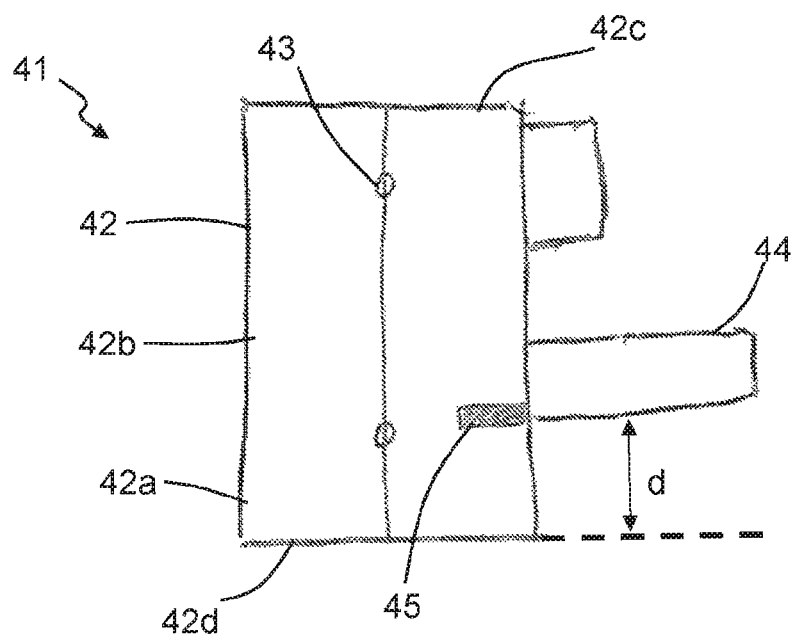
FIG. 8 is a side view of the cutting head shown in FIG. 6.
Figure 14:
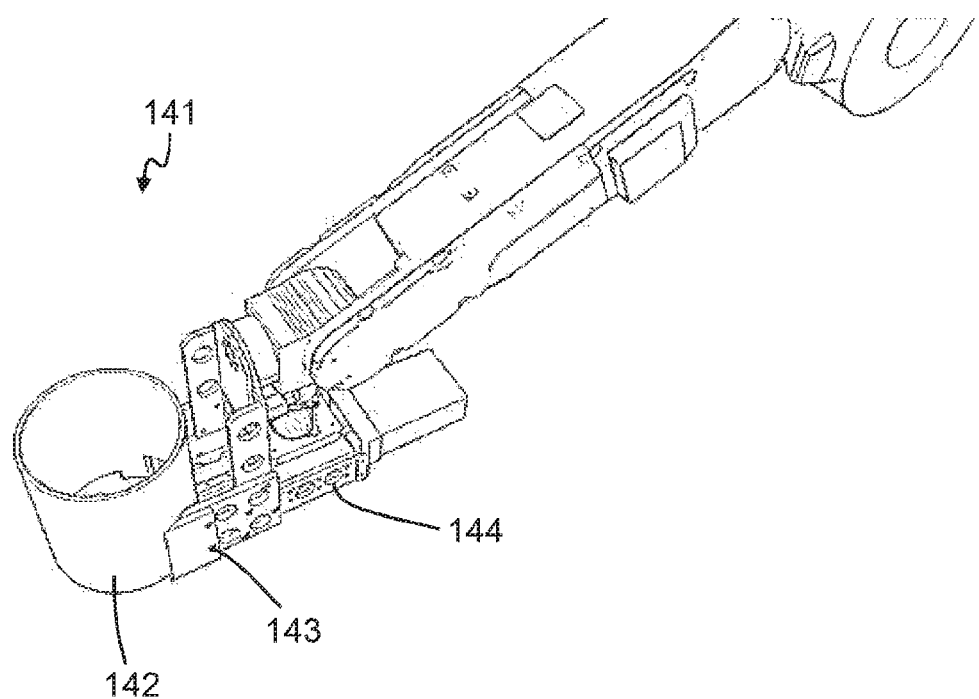
FIG. 14 is a perspective view of a cutting head according to an alternative embodiment of the invention.
Figure 15:
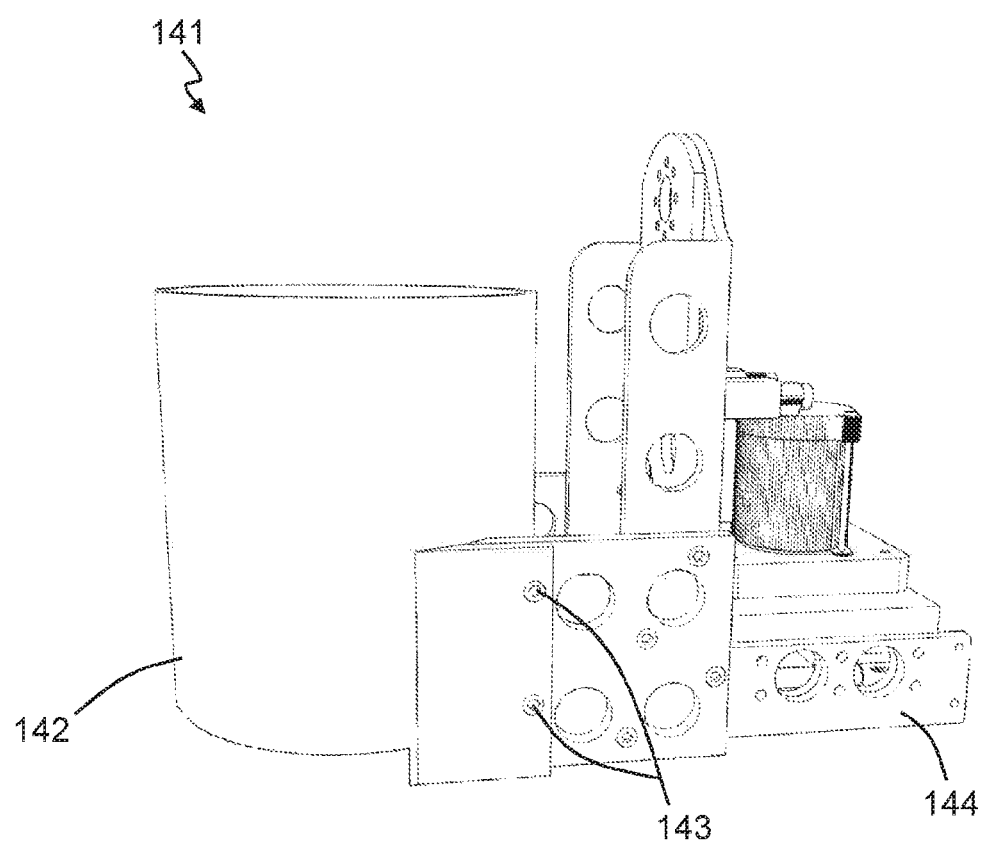
FIG. 15 is a side view of the cutting head shown in FIG. 14.

Referring now to FIGS. 14 and 15, there is shown a cutting head 141 according to an alternative embodiment of the invention, wherein like features to those shown in the cutting head 41 shown in FIGS. 7 and 8 are denoted by like features preceded by a '1', which will not be described herein further. The cutting head 141 shown in FIGS. 14 and 15 differs from that shown in FIGS. 7 and 8 in that the receptacle 142 is a unitary body (or is formed of parts not designed to separate from one another upon impact). Additionally, the receptacle 142 is connected to the cutting apparatus 144 by shear bolts 143, in this embodiment. If the receptacle 142 is subjected to an impact force (e.g. against a stone or the like) the receptacle 142 may be dislodged from the cutting apparatus 144, thereby protecting the cutting apparatus 144 (which may be relatively more expensive than is the receptacle 142) from at least part of the impact force experienced by the receptacle 142.

It will be appreciated by those skilled in the art that several variations to the aforementioned embodiments are envisaged without departing from the scope of the invention. For example, although the harvesting apparatus 1 shown in FIGS. 1 and 2 is described as being attached at its rear end 23 to a vehicle this need not be the case and alternatively, the harvesting apparatus 1 may comprise a motor or other prime mover for moving the harvesting apparatus 1 across an area to be harvested and/or a steering system for altering the direction of the harvesting apparatus 1 in motion. Additionally or alternatively, although a reduced pressure source 106 has been described in respect of the crop movement apparatus 100 shown in FIG. 6 this need not be the case and instead a positive pressure source may be provided. Where a positive pressure source is provided a further conduit communicating with the cutting head 41 is provided. The further conduit fluidly communicates with the positive pressure source and the cutting head 41. Thereby, in use, the positive pressure source applies a pressure differential across a harvested crop at the cutting heat 41 to push the harvested crop away from the cutting head 41 and toward the store S. Additionally or alternatively, although the receptacle 42 of the cutting head 41 is described as including a cutting aperture 45 this need not be the case and, instead, the blade (or other cutting means) of the cutting apparatus 44 may be arranged inside the receptacle 42.

It will be appreciated that any of the embodiments shown in the Figures can be combined with one another. For example, the ground motion sensor 26 shown in FIG. 13 can be included in the harvesting apparatus 1 shown in FIGS. 1 and 2 or the harvesting apparatus 11 shown in FIGS. 11 and 12. Furthermore, the cutting head 141 shown in FIGS. 14 and 15 can be included in the harvesting apparatus 1 shown in FIGS. 1 and 2 or the harvesting apparatus 11 shown in FIGS. 11 and 12. It will also be appreciated by those skilled in the art that any number of combinations of the aforementioned features and/or those shown in the appended drawings provide clear advantages over the prior art and are therefore within the scope of the invention described herein.

The invention claimed is:

1. Apparatus for harvesting crops, the apparatus comprising a carriage provided with a harvesting device, a ground height measuring device to measure or estimate the ground height at each harvested crop, a crop height measuring device to measure the height of a crop, a processor operatively connected to the ground height measuring device to generate baseline ground data and operatively connected to the crop height measuring device to determine a desired harvest height, a comparator to compare the baseline ground data to the desired harvest height to determine if a particular crop is to be harvested by the harvesting device.

2. Apparatus according to claim 1, wherein the processor is configured to control the harvesting device.

3. Apparatus according to claim 1, wherein the processor is configured to control the harvesting device to prevent harvest of a crop if desired harvest height is within a threshold value of the baseline ground data.

4. Apparatus according to claim 1, further comprising a device for measuring the distance travelled by carriage, the device comprising an encoder having an axle and a non-driven wheel for being moved, in use, across a surface over which the carriage is travelling, the non-driven wheel having a central axle which is connected to the axle of the encoder by a gear system arranged such that one 360 degree turn of the central axle of the non-driven wheel results in less than one 360 degree turn of the axle of the encoder.

5. Apparatus according to claim 4, wherein the device for measuring the distance travelled is operatively connected to the processor.

6. A method of harvesting crops using a carriage provided with a harvesting device, the method comprising:
   a) harvesting plural crops using the harvesting device;
   b) measuring or estimating the ground height at each harvested crop in order to generate baseline ground data;
   c) determining a height of a subsequent crop to determine a desired harvest height; and
   d) comparing the baseline ground data to the desired harvest height to decide whether to harvest the subsequent crop.

7. Method according to claim 6, wherein the generated baseline ground data comprises average ground height data and/or variations in ground height.

8. Method according to claim 6, comprising a step e) of preventing the harvesting device from harvesting the subsequent crop if the comparison of the baseline ground data to the desired harvest height is negative.

9. Method according to claim 8, comprising a step f) of harvesting a crop if the comparison of the baseline ground data to the desired harvest height is positive.

10. Method according to claim 6, comprising measuring the distance travelled by the carriage using an encoder having an axle and a non-driven wheel for being moved, in use, across a surface over which the carriage is travelling, the non-driven wheel having a central axle which is connected to the axle of the encoder by a gear system arranged such that one 360 degree turn of the central axle of the non-driven wheel results in less than one 360 degree turn of the axle of the encoder.

* * * * *